Figure 1:
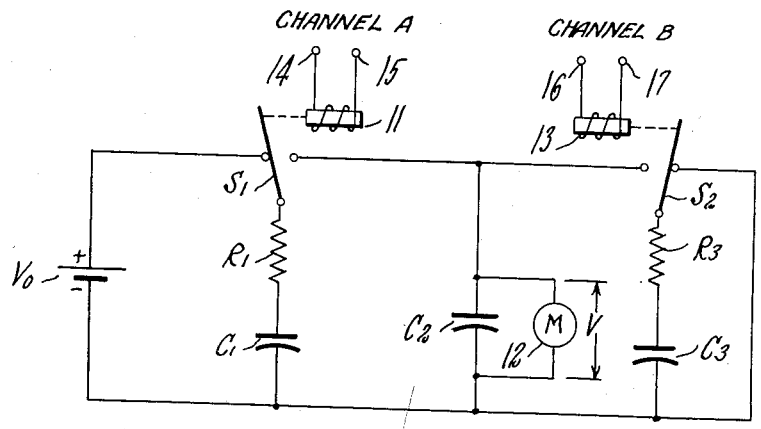

March 28, 1961 R. HINDEL 2,977,536
MEASURING APPARATUS FOR COUNTING RATE RATIOS
Filed April 28, 1958

— # United States Patent Office 2,977,536
Patented Mar. 28, 1961

2,977,536
MEASURING APPARATUS FOR COUNTING RATE RATIOS

Robert Hindel, Ashland, Mass., assignor to Baird-Atomic, Inc., Cambridge, Mass., a corporation of Massachusetts Filed Apr. 28, 1958, Ser. No. 731,254

3 Claims. (Cl. 324—79)

This invention relates generally to computations of physical quantities by means of electrical analogues, and more particularly it is concerned with the measurement of repetition rate ratios of recurrent signals.

It is the primary object of the invention to provide a simple and reliable rate comparator for trains of recurrent signals or counts.

A more specific object is to derive a voltage whose magnitude represents the ratio of the repetition rates of recurrent signals.

Another object is to provide apparatus of the above-mentioned character wherein indications of rate ratios are derived independently of the durations of the signals compared.

A still further object is to provide repetition rate comparison apparatus which is inherently much less complex than the apparatus hitherto used for this purpose wherein digital procedures are employed.

The novel features of the invention together with further objects and advantages thereof will become apparent from the following description of a preferred embodiment and from the accompanying drawing to which the description refers.

Figure 2:
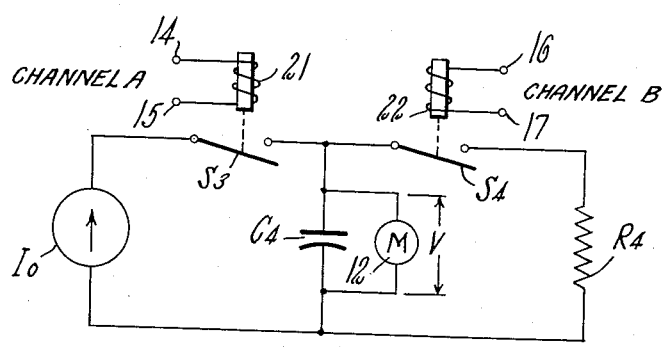

In the drawing:

Fig. 1 is a schematic diagram of the apparatus for comparing signal repetition rates according to the invention, and Fig. 2 is a schematic diagram of a modification of the system illustrated in Fig. 1, likewise in accordance with the invention.

In Fig. 1 the battery $V_0$ represents a convenient source of direct voltage. Connected to the source $V_0$ through a single pole double throw switch $S_1$ is a capacitor $C_1$ and a resistor $R_1$ disposed in series relation to one another. Switch $S_1$ is relay-actuated by a coil 11, and when so actuated, is adapted to disconnect the series circuit comprising the capacitor $C_1$ and the resistor $R_1$ from the source $V_0$, and to interconnect the circuit with a capacitor $C_2$. A voltmeter 12 is connected across the capacitor $C_2$.

Toward the right of Fig. 1 is still a third circuit formed with a capacitor $C_3$ and a resistor $R_3$. This circuit is normally shorted by a switch $S_2$ actuated by a coil 13 in like manner as switch $S_1$. Switch $S_2$, when actuated, connects capacitor $C_3$ and resistor $R_3$ across capacitor $C_2$, at the same time breaking the short circuit. Terminals 14 and 15 at the ends of the coil 11 serve as an input for a first train of signals or pulses in a channel designated A, and terminals 16 and 17 at the ends of coil 13 provide an input for a second train of signals in a channel designated B.

In operation, each time a signal appears in channel A, switch $S_1$ is actuated, and capacitor $C_1$, having been charged to the voltage $V_0$ by the source, is partially discharged through the resistor $R_1$ into the capacitor $C_2$. The lower is the value of V, the voltage across the capacitor $C_2$, the more charge is transferred thereto. Similarly, the more rapid is the repetition rate of the signals in channel A, the greater is the amount of charge transferred to capacitor $C_2$ per unit of time. This is indicated by the following expression wherein $Q_i$ is the amount of charge transferred per unit of time, and $N_1$ is the number of signals that appear in channel A during this unit of time.

$$Q_i = (V_0 - V)N_1 C_1$$

When there is a signal in channel B, switch $S_2$ is actuated, and capacitor $C_3$, having been discharged through resistor $R_3$, absorbs charge from capacitor $C_2$. The higher is the voltage V, the greater is the amount of charge absorbed by capacitor $C_3$. The total amount of charge withdrawn from capacitor $C_2$ during any given period of time as a result of successive switching operations depends upon the repetition rate of the signals in the B channel. The following expression approximately reflects the amount of charge $Q_0$ withdrawn from the capacitor $C_2$ as a function of the voltage V and the repetition rate $N_2$ of signals in channel B.

$$Q_0 = V N_2 C_3$$

When an equilibrium condition obtains, the amount of charge withdrawn from capacitor $C_2$ is equal to the amount of charge transferred thereto, or in other words, $Q_i$ is equal to $Q_0$. Thus Equations 1 and 2 may be written:

$$V = V_0 \frac{N_1 C_1}{N_1 C_1 + N_2 C_3}$$

If $C_2$ is very much larger than $C_1$, then $N_1 C_1$ may be neglected and the following approximation results, $$V \approx V_0 \left(\frac{N_1}{N_2}\right)\frac{C_1}{C_3}$$

wherein V, the measured voltage, is proportional to the ratio of the repetition rates of the signals. Since a preferred value for $C_3$ is 8 mfd. and for $C_1$ .005 mfd., the voltage V across the capacitor $C_2$ will in fact provide an accurate measure of the ratio of the repetition rates of the signals in the channels A and B. The $N_1 C_1$ term, to the extent that it is operative, merely reflects the minute fluctuations in the voltage V that occur when switching takes place, which under normal operating conditions are too small and too rapid to be observed.

A modification of the system of Fig. 1 is illustrated in Fig. 2. In Fig. 2, $I_0$ represents a source of electrical energy in the form of a current generator which is adapted to be connected to a capacitor $C_4$ through a switch $S_3$. Switch $S_3$ is actuated by a coil 21. Also adapted to be connected to the capacitor by means of a switch $S_4$ is a resistor $R_4$. Switch $S_4$ is actuated by a coil 22. As in Fig. 1, there is a meter 12 to measure the voltage V across the capacitor $C_4$ and there are terminals 14–17 at the ends of the coils 21 and 22 to designate the inputs to the apparatus from the A and B signal channels.

In operation, if it be assumed that the switches $S_1$ and $S_2$ are caused by the respective signals to close $N_1$ and $N_2$ times per unit of time, and that $T_1$ and $T_2$ represent the respective durations of the signals, then at equilibrium $$N_1 T_1 I_0 = N_2 T_2 \frac{V}{R_4}$$

or $$V = I_0 R_4 \frac{T_1}{T_2}\left(\frac{N_1}{N_2}\right)$$

It may be seen, therefore, that the meter 12 in the modification of Fig. 2 will provide an indication that is not only proportional to the ratio of the repetition rates of the signals but also to their durations. The value of $R_4$ determines the proportionality constant between V and $I_0$.

The resistors $R_1$ and $R_3$ in Fig. 1, on the other hand, function primarily as current limiting devices. The only limitation on their size is that the (charging) time constant of the $R_1C_1$ circuit and the (discharge) time constant of the $R_3C_3$ circuit preferably should be small enough so that capacitor $C_1$ is completely charged and capacitor $C_3$ is completely discharged in the respective inter-signal periods. Values of 3000 ohms for $R_1$ and 300 ohms for $R_3$ have been found to work out well in practice, $R_1$ being larger than $R_3$ because of the relatively higher voltage developed momentarily across $C_1$. A suitable value for $C_3$ in combination with the aforementioned circuit parameters is .1 mfd.

Although the invention has been described in terms of a preferred embodiment and a single modification thereof, it will be apparent to those skilled in the art that various other modifications are possible which make use of the basic principle of the invention. For example, electronic switching circuits may be readily substituted for the relay-actuated switches. If the latter are used, it may be desirable, of course, to provide a suitable amount of amplification in the signal channels depending upon the nature of the signals. Therefore, the invention should not be deemed to be limited to what has been described herein by way of illustration, but rather it should be deemed to be limited only by the scope of the appended claims.

What is claimed is:

1. A rate comparator for trains of recurrent signals comprising first, second, and third capacitors to store electrical energy, a voltage source connected to said first capacitor, a first switching circuit repetitively to disconnect said first capacitor from said source and to interconnect said first and second capacitors in response to successive signals in a first train, a discharge path for said third capacitor, a second switching circuit repetitively to interrupt said path and to interconnect said second and third capacitors in response to successive signals in a second train, and a voltage measuring device connected to said second capacitor to measure the voltage thereon.

2. Apparatus according to claim 1 wherein the capacitance value of said second capacitor is substantially greater than that of said first and third capacitors.

3. Apparatus according to claim 2 including individual resistors disposed in series relation to said first and third capacitors to limit the currents therein.

References Cited in the file of this patent

UNITED STATES PATENTS

| | | |
|---|---|---|
| 2,026,421 | Fecker | Dec. 31, 1935 |
| 2,110,015 | Fitzgerald | Mar. 1, 1938 |
| 2,114,016 | Dimond | Apr. 12, 1938 |
| 2,195,562 | Duclos | Apr. 2, 1940 |
| 2,285,482 | Wunsch | June 9, 1942 |
| 2,411,573 | Holst | Nov. 26, 1946 |
| 2,473,542 | Philpott | June 21, 1949 |
| 2,607,528 | McWhirter | Aug. 19, 1952 |
| 2,663,863 | Buehler | Dec. 22, 1953 |
| 2,715,712 | Pulsford | Aug. 16, 1955 |
| 2,741,756 | Stocker | Apr. 10, 1956 |
| 2,759,138 | Andrews | Aug. 14, 1956 |
| 2,822,978 | Donovan | Feb. 11, 1958 |
| 2,904,690 | Kraayeveld et al. | Sept. 15, 1959 |
| 2,927,271 | Gordon | Mar. 1, 1960 |